US012607117B2

(12) United States Patent
Hayenga et al.

(10) Patent No.: US 12,607,117 B2
(45) Date of Patent: Apr. 21, 2026

(54) SOLID STATE TUNING WITH COUPLED INDUCTORS FOR DOWNHOLE SYSTEMS

(71) Applicant: Halliburton Energy Services, Inc., Houston, TX (US)

(72) Inventors: Mark Wayne Hayenga, Sunnyvale, CA (US); Matthew C. Griffing, Kingwood, TX (US); Jebreel M M Salem, Spring, TX (US); Ranganathan Sridharan, Houston, TX (US); Imran Sharif Vehra, Houston, TX (US); Maxim Yushko, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 183 days.

(21) Appl. No.: 17/955,352

(22) Filed: Sep. 28, 2022

(65) Prior Publication Data

US 2023/0094814 A1     Mar. 30, 2023

Related U.S. Application Data

(60) Provisional application No. 63/249,922, filed on Sep. 29, 2021.

(51) Int. Cl.
*E21B 47/13*        (2012.01)
*H04L 25/02*       (2006.01)
*H04L 25/03*       (2006.01)

(52) U.S. Cl.
CPC .......... *E21B 47/13* (2020.05); *H04L 25/0204* (2013.01); *H04L 25/03178* (2013.01)

(58) Field of Classification Search
None
See application file for complete search history.

(56) References Cited

U.S. PATENT DOCUMENTS 7,303,007 B2    12/2007  Konschuh et al.
7,489,526 B2 *   2/2009  Chen ................. H02M 3/33523
                                                              363/17
(Continued)

FOREIGN PATENT DOCUMENTS

JP        2007278719 A     10/2007

OTHER PUBLICATIONS

Lombardo et. al , Galvanic Isolation (Year: 2016).*
(Continued)

*Primary Examiner* — Steven Lim
*Assistant Examiner* — Jerold B Murphy
(74) *Attorney, Agent, or Firm* — DeLizio, Peacock, Lewin and Guerra, LLP

(57)         ABSTRACT

The disclosed embodiments include multi-channel communications filters, multi-channel communications systems, apparatuses that utilize a tunable multi-channel communications filter for antenna tuning, and methods to perform multi-channel communications filter tuning. A multi-channel communications filter includes a coupled inductor having a primary winding that is coupled to a power source, and magnetically coupled to one or more secondary windings. The multi-channel communications filter also includes a tuning bank formed from a first set of capacitors; and a first set of switches that are configured to adjust capacitance of the first set of capacitors to impede signals having a first frequency range from flowing through the multi-channel communications filter. The tuning bank and the first set of switches are coupled to the one or more secondary windings.

20 Claims, 8 Drawing Sheets

(56)                References Cited

U.S. PATENT DOCUMENTS

| | | | |
|---|---|---|---|
| 8,364,195 B2 * | 1/2013 | Spina ................. | H04L 25/0268 |
| | | | 307/104 |
| 8,514,098 B2 | 8/2013 | Montgomery et al. | |
| 8,576,930 B2 * | 11/2013 | Lombardo .......... | H04L 25/0276 |
| | | | 375/258 |
| 10,539,013 B2 | 1/2020 | Vehra et al. | |
| 2002/0150156 A1 * | 10/2002 | Calvin ............... | H04L 25/0266 |
| | | | 375/258 |
| 2003/0042571 A1 * | 3/2003 | Chen ..................... | H04B 5/266 |
| | | | 336/200 |
| 2005/0104743 A1 | 5/2005 | Ripolone et al. | |
| 2008/0007416 A1 * | 1/2008 | Cern ..................... | G01R 23/06 |
| | | | 340/664 |
| 2010/0283468 A1 * | 11/2010 | Signorelli ............... | G01V 3/28 |
| | | | 343/866 |
| 2011/0251813 A1 | 10/2011 | Coman et al. | |
| 2012/0001629 A1 * | 1/2012 | Hopper .................... | G01V 3/32 |
| | | | 324/303 |
| 2012/0068712 A1 | 3/2012 | Taherian et al. | |
| 2012/0163523 A1 | 6/2012 | Tang | |
| 2014/0192621 A1 * | 7/2014 | Ram ....................... | E21B 47/14 |
| | | | 367/81 |

| | | | |
|---|---|---|---|
| 2014/0311804 A1 | 10/2014 | Gadot et al. | |
| 2014/0354446 A1 | 12/2014 | Nakayama et al. | |
| 2015/0326127 A1 * | 11/2015 | Peng .................... | H05B 45/382 |
| | | | 363/21.01 |
| 2017/0059637 A1 | 3/2017 | Santoso et al. | |
| 2017/0176364 A1 | 6/2017 | Lyon | |
| 2017/0315263 A1 | 11/2017 | Griffing et al. | |
| 2018/0062678 A1 * | 3/2018 | Ragonese ............... | H01F 19/04 |
| 2019/0049614 A1 * | 2/2019 | Griffing .................. | E21B 47/12 |
| 2019/0225099 A1 | 7/2019 | Sieber et al. | |
| 2019/0226332 A1 * | 7/2019 | Vehra ...................... | G06F 13/00 |
| 2019/0391292 A1 * | 12/2019 | Zhou .................. | G01R 33/3628 |
| 2020/0291769 A1 * | 9/2020 | Torbett ..................... | H04B 1/10 |
| 2021/0231005 A1 | 7/2021 | Vehra et al. | |

OTHER PUBLICATIONS

Parisi et al., Isolation Transformer for Multi-Channel Communication (Year: 2020).*

International Search Report and Written Opinion mailed Dec. 18, 2017 in PCT Application No. PCT/US2017/039285 (10 pages).

International Search Report & Written Opinion in PCT/US2022/045189, mailed Jan. 20, 2023.

* cited by examiner

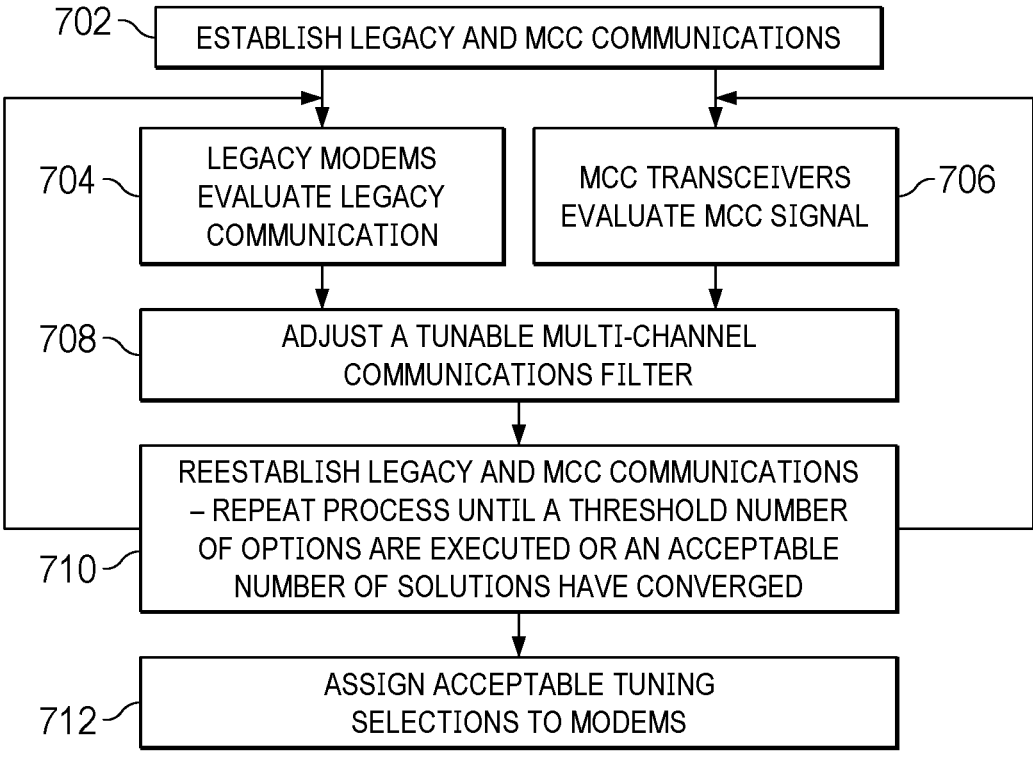

702 — ESTABLISH LEGACY AND MCC COMMUNICATIONS

704 — LEGACY MODEMS EVALUATE LEGACY COMMUNICATION

MCC TRANSCEIVERS EVALUATE MCC SIGNAL — 706

708 — ADJUST A TUNABLE MULTI-CHANNEL COMMUNICATIONS FILTER

710 — REESTABLISH LEGACY AND MCC COMMUNICATIONS – REPEAT PROCESS UNTIL A THRESHOLD NUMBER OF OPTIONS ARE EXECUTED OR AN ACCEPTABLE NUMBER OF SOLUTIONS HAVE CONVERGED

712 — ASSIGN ACCEPTABLE TUNING SELECTIONS TO MODEMS

FIG. 7

SOLID STATE TUNING WITH COUPLED INDUCTORS FOR DOWNHOLE SYSTEMS

BACKGROUND

The present disclosure relates generally to multi-channel communications filters, multi-channel communications systems, apparatuses that utilize a tunable multi-channel communications filter for antenna tuning, and methods to perform multi-channel communications.

Communication with downhole tools and sensors of a downhole communications system is sometimes established and maintained to determine wellbore conditions at or near the downhole tools and sensors, and to check on the health of the downhole tools and sensors. However, downhole communication signals are sometimes affected by noise, interference, loading effects of additional tools and sensors, and/or other types of undesirable signals and/or conditions, or have low signal-to-noise ratios.

BRIEF DESCRIPTION OF THE DRAWINGS

Illustrative embodiments of the present disclosure are described in detail below with reference to the attached drawing figures, which are incorporated by reference herein, and wherein:

FIG. 7 is a flow chart of a method to perform multi-channel communications filter tuning across the single wire bus of FIG. 6.

Figure 1:
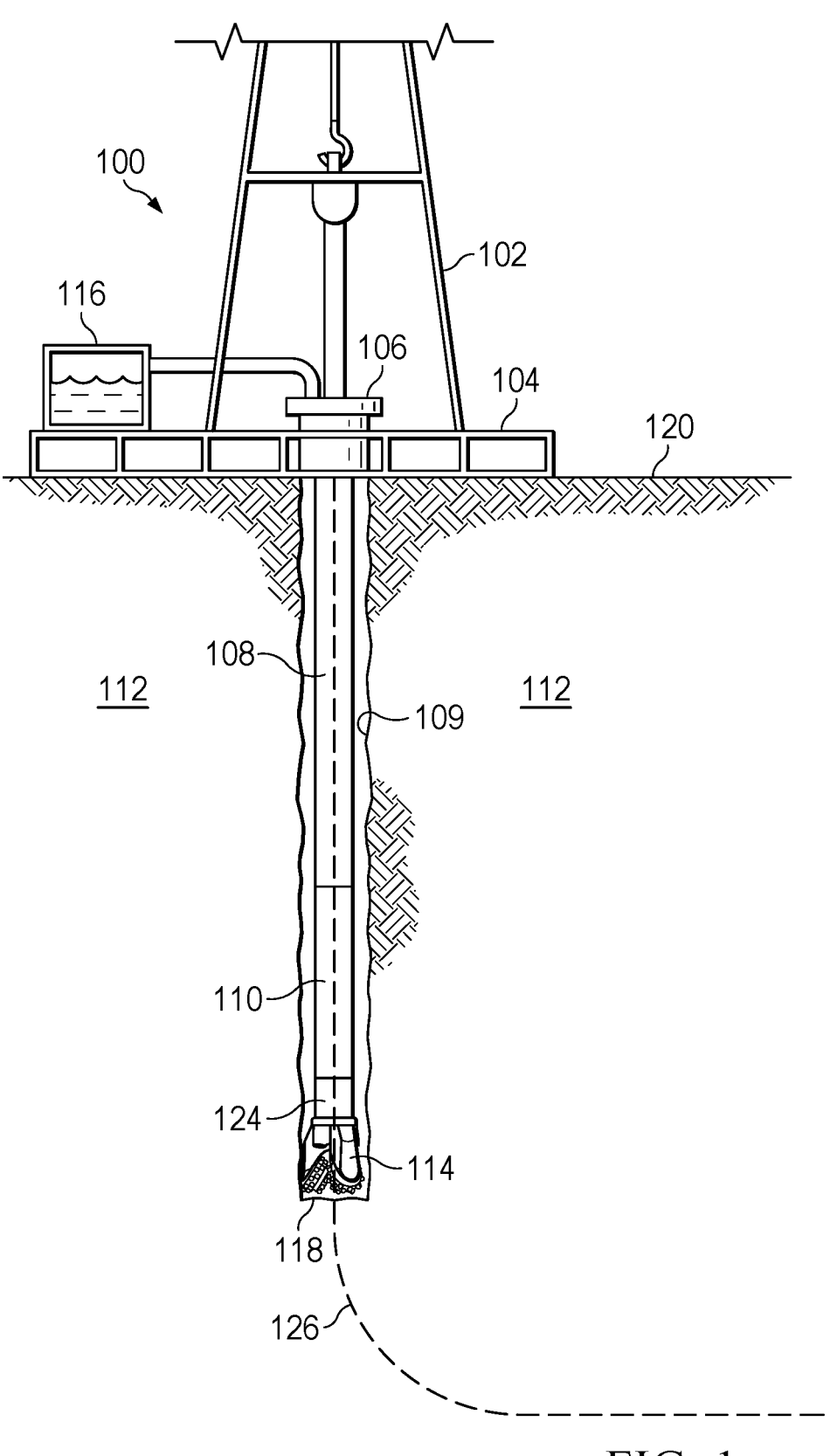
FIG. 1 is a schematic view of a drilling system within a well.

The illustrated figures are only exemplary and are not intended to assert or imply any limitation with regard to the environment, architecture, design, or process in which different embodiments may be implemented.

DETAILED DESCRIPTION

In the following detailed description of the illustrative embodiments, reference is made to the accompanying drawings that form a part hereof. These embodiments are described in sufficient detail to enable those skilled in the art to practice the invention, and it is understood that other embodiments may be utilized, and that logical structural, mechanical, electrical, and chemical changes may be made without departing from the spirit or scope of the invention. To avoid detail not necessary to enable those skilled in the art to practice the embodiments described herein, the description may omit certain information known to those skilled in the art. The following detailed description is, therefore, not to be taken in a limiting sense, and the scope of the illustrative embodiments is defined only by the appended claims.

The present disclosure relates to multi-channel communications filters, multi-channel or/and multi-scheme communications systems, apparatuses that utilize a tunable multi-channel communications filter for antenna tuning, and methods to perform multi-channel communications filter tuning. A multi-channel communications filter includes a coupled inductor having a primary winding that is coupled to a power source and magnetically coupled to one or more secondary windings. The multi-channel communications filter also includes a tuning bank formed from a first set of capacitors. The multi-channel communications filter also includes a first set of switches that are configured to adjust capacitance of the first set of capacitors to impede signals having a first frequency range from flowing through the multi-channel communications filter, where the tuning bank and the first set of switches are coupled to the one or more secondary windings. In some embodiments, the set of switches are MOSFETs. In some embodiments, the multi-channel communications filter also includes a biasing resistor that is coupled to the tuning bank. In some embodiments, the multi-channel communications filter also includes a bypass configured to form a low impedance path around components that are coupled to the one or more secondary windings.

An apparatus that utilizes a tunable multi-channel communications filter concept for antenna includes a transformer having a primary winding that is coupled to a power source or an antenna, and magnetically coupled to one or more secondary windings. The multi-channel communications filter also includes a tuning bank formed from a first set of capacitors. The multi-channel communications filter further includes a first set of switches that are configured to adjust capacitance of the first set of capacitors to impede or tune signals having a first frequency range from flowing through the multi-channel communications filter, where the tuning bank and the first set of switches are coupled to the one or more secondary windings. In some embodiments, the transformer is in a series configuration with the tuning bank and the first set of switches.

In some embodiments, the multi-channel communications filter also includes a second tuning bank formed from a second set of capacitors. In one or more of such embodiments, the multi-channel communications filter also includes a second set of switches that are configured to adjust capacitance of the second set of capacitors to impede signals having a second frequency range from flowing through the multi-channel communications filter, where the second tuning bank and the second set of switches are coupled to the one or more secondary windings. In one or more of such embodiments, the multi-channel communications filter includes a third tuning bank formed from a third set of capacitors. In one or more of such embodiments, the multi-channel communications filter also includes a third set of switches that are configured to adjust capacitance of the third set of capacitors to impede signals having a third frequency range from flowing through the multi-channel communications filter. In one or more of such embodiments, the third tuning bank and the third set of switches are coupled to the one or more secondary windings. In one or more of such embodiments, the multi-channel communications filter includes additional tuning banks and switches that are configured to impede signals having different frequency ranges. In one or more of such embodiments, certain frequency ranges that are impeded by different switches overlap each other. For example, the frequency range impeded by the set of switches and the second frequency range impeded by the second set of switches partially overlap each other. Additional descriptions of multi-channel communications filters, multi-channel or/and multi-scheme communications systems, apparatuses that utilize a tunable multi-channel communications filter for antenna tuning, and methods to perform multi-channel communications filter tuning are provided in the paragraphs below and are illustrated in at least FIGS. 1-7.

Now turning to the figures, FIG. 1 is a schematic view of a drilling system 100 within a well. The drilling system 100 includes a derrick 102 that is buttressed by a derrick floor 104. The derrick floor 104 supports a rotary table 106 that is driven during drilling at a desired rotational speed, for example, via a chain drive system through operation of a prime mover (not shown). The rotary table 106, in turn, provides the rotational force to a drill string 108 within a wellbore 109. The drill string 108, as illustrated, is coupled to a bottom hole assembly (BHA) 110. As described in detail below with reference to FIG. 2, the BHA 110 includes sensors and legacy sensors positioned along a single wire bus to take survey measurements of a formation 112 and positioning measurements of a drill bit 114.

The drilling system 100 also includes a drilling fluid reservoir 116. The drilling fluid reservoir 116 provides drilling fluid (e.g., drilling mud) through the drill string 108 to the BHA 110. The drilling fluid may continuously circulate through drill string 108, to an end 118 of the wellbore 109, and back to a surface 120. Further, the drilling fluid provides hydrostatic pressure that prevents formation fluids from entering into the wellbore 109, keeps the drill bit 114 cool and clean, and carries out drill cuttings during a drilling process. When a drilling motor is present within a steering system 124 between the BHA 110 and the drill bit 114, the flow of drilling fluid through the drill string 108 generates power at the BHA 110. In some embodiments, the power generated at the drilling motor provides power to the BHA 110. While the drilling motor is described as a part of the steering system 124 positioned between the BHA 110 and the drill bit 114, the drilling motor may be positioned anywhere along the drill string 108 sufficient to provide power to downhole tools of the drilling system 100.

In an embodiment, the steering system 124 is positioned in close proximity to the drill bit 114. The steering system 124 provides steering control to the drill bit 114 in addition to the drilling motor functions described above. For example, a target path 126 is programmed into the steering system 124 prior to commencing a drilling operation of the wellbore 109. The target path 126 may be embodied as instructions stored in a memory of the steering system 124, and a processor of the steering system 124 executes the instructions to control the direction of drilling by the drill bit 114. Sensors within the BHA 110 or the legacy sensors provide survey data to the steering system 124 during drilling operations that provides an indication of a location of the drill bit 114 during the drilling process. The steering system 124 uses this data to maintain the drill bit 114 on the target path 126 or to realign the drill bit 114 to the target path 126 when the steering system 124 receives an indication that the drill bit 114 has drifted from the target path 126.

Figure 2:
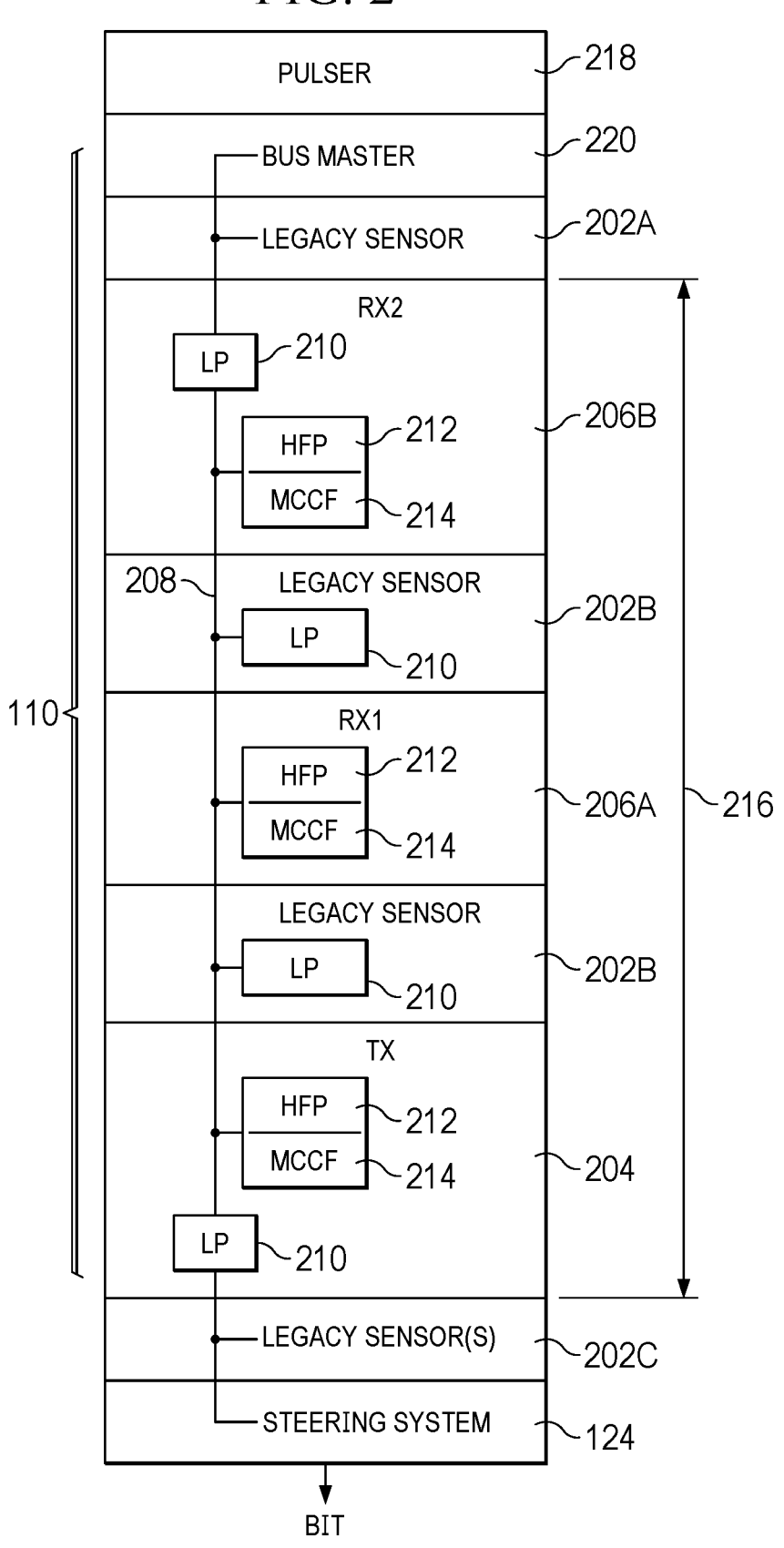
FIG. 2 is a schematic view of a bottom hole assembly of the drilling system of FIG. 1.

FIG. 2 is a schematic view of the BHA 110 and the steering system 124 of the drilling system 100 as shown in FIG. 1. In an embodiment, the BHA 110 includes one or more legacy sensors 202, one or more deep reading resistivity tool transmitters 204, and one or more deep reading resistivity tool receivers 206A and 206B positioned along a single wire bus 208 of the BHA 110. The legacy sensors 202, the deep reading resistivity tool transmitters 204, and the deep reading resistivity tool receivers 206 may include accelerometers, gyroscopes, magnetometers, resistivity tools, and any other downhole tools that, when used in varying combinations, provide an indication of the location of the drill bit 114 and characteristics of the formation 112 surrounding the wellbore 109 at a position of the BHA 110.

The legacy sensors 202 communicate across the single wire bus 208 using a legacy single wire protocol based on a MIL-STD-1553 standard for bus communication. The legacy single wire protocol is a protocol for communication between legacy sensors 202 (i.e., tools currently implemented on a bottom hole assembly) positioned along the single wire bus 208. The communication over the single wire bus 208 under the legacy single wire protocol involves communication using square waves at a frequency within an order of magnitude of 200 kHz. The single wire bus 208 also provides power to the legacy sensors 202. As used herein, the term "legacy sensor" may refer to any sensor positioned along the single wire bus 208 that communicates along the single wire bus 208 at a different frequency than the deep reading resistivity tool transmitters 204, the deep reading resistivity tool receivers 206, and/or deep reading resistivity transceivers (not shown) (e.g., at a different frequency than high frequency communication sensors).

Upon implementing the deep reading resistivity tool transmitters 204, the deep reading resistivity tool receivers 206, and/or deep reading resistivity tool transceivers (not shown), which may collectively be referred to as high frequency communication sensors, along the single wire bus 208, the single wire bus 208 is able to provide an additional physical layer for communication between the deep reading resistivity tools 204 and 206 and provide power for the deep reading resistivity tools 204 and 206. As used herein, the term "high frequency" may refer to a communications frequency that is greater than the frequency of a legacy signal of the legacy sensors 202. In operation, the deep reading resistivity tool transmitter 204 and the deep reading resistivity tool receivers 206 may communicate with each other using a signal with a frequency that is an order of magnitude greater than the frequency of legacy signals used by the legacy sensors 202 (e.g., an order of magnitude greater than 200 kHz). In an embodiment, the deep reading resistivity tool transmitter 204 may provide communication signals to the deep reading resistivity tool receivers 206 in a master-slave configuration. As an example of the deep reading resistivity tool communication signal, the deep reading resistivity tool transmitter 204 and the deep reading resistivity tool receivers 206 communicate across the single wire bus 208 at a tone of interest of 1 MHz. The deep reading resistivity tool signal provided by the deep reading resistivity tool transmitter 204 and the deep reading resistivity tool receivers 206 may be a pure tone sine wave with very little harmonics. Using the deep reading resistivity tool signal, a half-duplex communication along the single wire bus 208 is achieved between the deep reading resistivity tool transmitter 204 and the deep reading resistivity tool receivers 206. While the deep reading resistivity tool transmitter 204, the deep reading resistivity tool receivers 206, and the deep reading resistivity transceivers are collectively referred to as "communication sensors" or "high frequency communication sensors," it may be appreciated by those skilled in the art that the "communication sensors" are defined as sensors that are capable of communicating across the single wire bus 208 at a frequency greater than the frequency of legacy signals used by the legacy sensors 202 for legacy sensor communication.

To prevent the lower frequency communication between the legacy sensors 202 from interfering with the higher frequency communication between the deep reading resistivity tool transmitter 204 and the deep reading resistivity tool receivers 206, or vice versa, each of the legacy sensors 202, the deep reading resistivity tool transmitter 204, and the deep reading resistivity tool receivers 206 include high quality factor (Q) passive filters between the tools 202, 204, and 206 and the single wire bus 208. To help illustrate, FIG. 2 depicts low pass filters 210 that are positioned on extreme ends of the single wire bus 208. The low pass filters 210 prevent the higher frequency signals from the deep reading resistivity tools 204 and 206 from extending beyond a portion of the single wire bus 208 at which multi-channel communication is desirable. Accordingly, the high frequency tones provided by the deep reading resistivity tools 204 and 206 are filtered out from the single wire bus 208 before the single wire bus 208 reaches the legacy sensor 202A or the legacy sensor 202C. In this manner, legacy sensor communication between the legacy sensors 202A and 202C is achieved without interference from the high frequency tones of the deep reading resistivity tools 204 and 206. In an embodiment, the legacy sensors 202A and 202C include more than one legacy sensor 202.

Within a multi-channel communication range of the single wire bus 208 (e.g., between the low pass filters 210), the deep reading resistivity tool transmitter 204, the deep reading resistivity tool receivers 206A and 206B, and the legacy sensors 202B each include filters to prevent interference from the high frequency signals or the low frequency signals at the deep reading resistivity tool transmitter 204, the deep reading resistivity tool receivers 206A and 206B, and the legacy sensors 202B. In this manner, the single wire bus 208 is able to carry both the high frequency signals and the low frequency signals in a single amplitude modulated signal, and the high frequency signals and the low frequency signals do not interfere with each other when received at the deep reading resistivity tools 204 and 206 or the legacy sensors 202. As illustrated, each of the legacy sensors 202B include low pass filters 210. The low pass filters 210, in an embodiment, are the same as the low pass filters 210 positioned at each end of the multi-channel communication range of the single wire bus 208. The low pass filters 210 of the legacy sensors 202B allow the lower frequency signals from the legacy sensors 202 to be received at the legacy sensors 202B, and the low pass filters 210 block transmission of the higher frequency deep reading resistivity tool signals present on the single wire bus 208. In an embodiment, the low pass filters 210 of the legacy sensors 202B and the low pass filters 210 positioned at each end of the multi-channel communication range of the single wire bus 208 may also be a tunable multi-channel communications filter or a band stop filter that rejects the band of frequencies associated with the higher frequency deep reading resistivity tool signals.

The deep reading resistivity tool transmitter 204 and the deep reading resistivity tool receivers 206A and 206B each include high frequency pass filters 212 and tunable multi-channel communications filters 214. The high frequency pass filters 212 allow the higher frequency deep reading resistivity tool signals to pass to the deep reading resistivity tool transmitter 204 and the deep reading resistivity tool receivers 206A and 206B. Additionally, to inject clean deep reading resistivity tool signals onto the single wire bus 208, the deep reading resistivity tool transmitter 204 and the deep reading resistivity tool receivers 206A and 206B include the tunable multi-channel communications filters 214. The tunable multi-channel communications filters 214 are shunted to ground and shunt any lower frequency noise that may be present in a deep reading resistivity tool signal applied to the single wire bus 208 from the deep reading resistivity tool transmitter 204 and/or the deep reading resistivity tool receivers 206A and 206B.

While the illustrated embodiment includes the two legacy sensors 202B, the deep reading resistivity tool transmitter 204, and the deep reading resistivity tool receivers 206A and 206B positioned along the multi-channel communication range of the single wire bus 208, it is also contemplated that additional legacy sensors 202B, deep reading resistivity tool transmitters 204, and deep reading resistivity tool receivers 206A and 206B may be positioned along the multi-channel communication range of the single wire bus 208. As a distance 216 between the deep reading resistivity tool transmitter 204 and the bottommost deep reading resistivity tool receiver 206B may be greater than 100 feet, there may be sufficient room along the multi-channel communication range of the single wire bus 208 for several tools in addition to the downhole tools illustrated in FIG. 2.

In addition to facilitating communication between the deep reading resistivity tool transmitter 204 and the deep reading resistivity tool receivers 206A and 206B, which is known as downhole communication, one of the deep reading resistivity tool transmitter 204 or receivers 206A or 206B provides high frequency pulses across the single wire bus 208 to the remaining deep reading resistivity tools 204 and/or 206 of the BHA 110. The pulses are filtered out by the low pass filters 210 at the legacy sensors 202 and allowed to pass to the deep reading resistivity tool transmitter 204 and the deep reading resistivity tool receivers 206A and 206B through the high frequency pass filters 212. The pulses provide synchronized timing signals between the deep reading resistivity tool transmitter 204 and the deep reading resistivity tool receivers 206A and 206B such that the deep reading resistivity tool transmitter 204 and the deep reading resistivity tool receivers 206A and 206B are able to obtain synchronized sample measurements upon outputting or receiving the pulse signals. For example, a high frequency pulse supplied to the single wire bus 208 by the deep reading resistivity transmitter 204 provides a synchronized signal for analog-to-digital converter sampling at the deep reading resistivity tool transmitter 204 and the deep reading resistivity tool receivers 206A and 206B. Synchronization of the sample measurements enables an accurate comparison of the electromagnetic signal transmitted into the formation 112 by the deep reading resistivity tool transmitter 204 and the electromagnetic signals received from the formation 112 by the deep reading resistivity tool receivers 206A and 206B. The changes in the signal (e.g., a time shift, a change in amplitude, etc.) provide details about characteristics of the formation 112. The sample measurements may be stored within a memory located within each of the deep reading resistivity tool transmitter 204 and the deep reading resistivity tool receivers 206A and 206B and analyzed at the surface 120 upon removal of the BHA 110 from the wellbore 109. In an embodiment, the deep reading resistivity tools 204 and 206 may alternate between sampling using the pulse signals and transmitting data across the single wire bus 208. Accordingly, the physical layer added by transmitting data at a greater frequency than the legacy signals of the legacy sensors 202 enables sampling synchronization and data transmission from the deep reading resistivity tools 204 and 206.

While the deep resistivity tools 204 and 206 are described above using communication schemes at different frequencies from the legacy communication schemes, the deep resistivity tools 204 and 206 maintain communication capabilities using the legacy communication schemes. In an embodiment, a bus master 220 is able to receive data from both legacy signals injected onto the single wire bus 208 by the legacy sensors 202 and the deep reading resistivity signals injected onto the single wire bus 208 by the deep reading resistivity tools 204 and 206. The bus master 220 is then able to select data to send to a pulser 218. The pulser 218 is able to pulse the data received from the bus master 220 to the surface 120 using mud pulse telemetry or electromagnetic pulses, for example.

Figure 3:
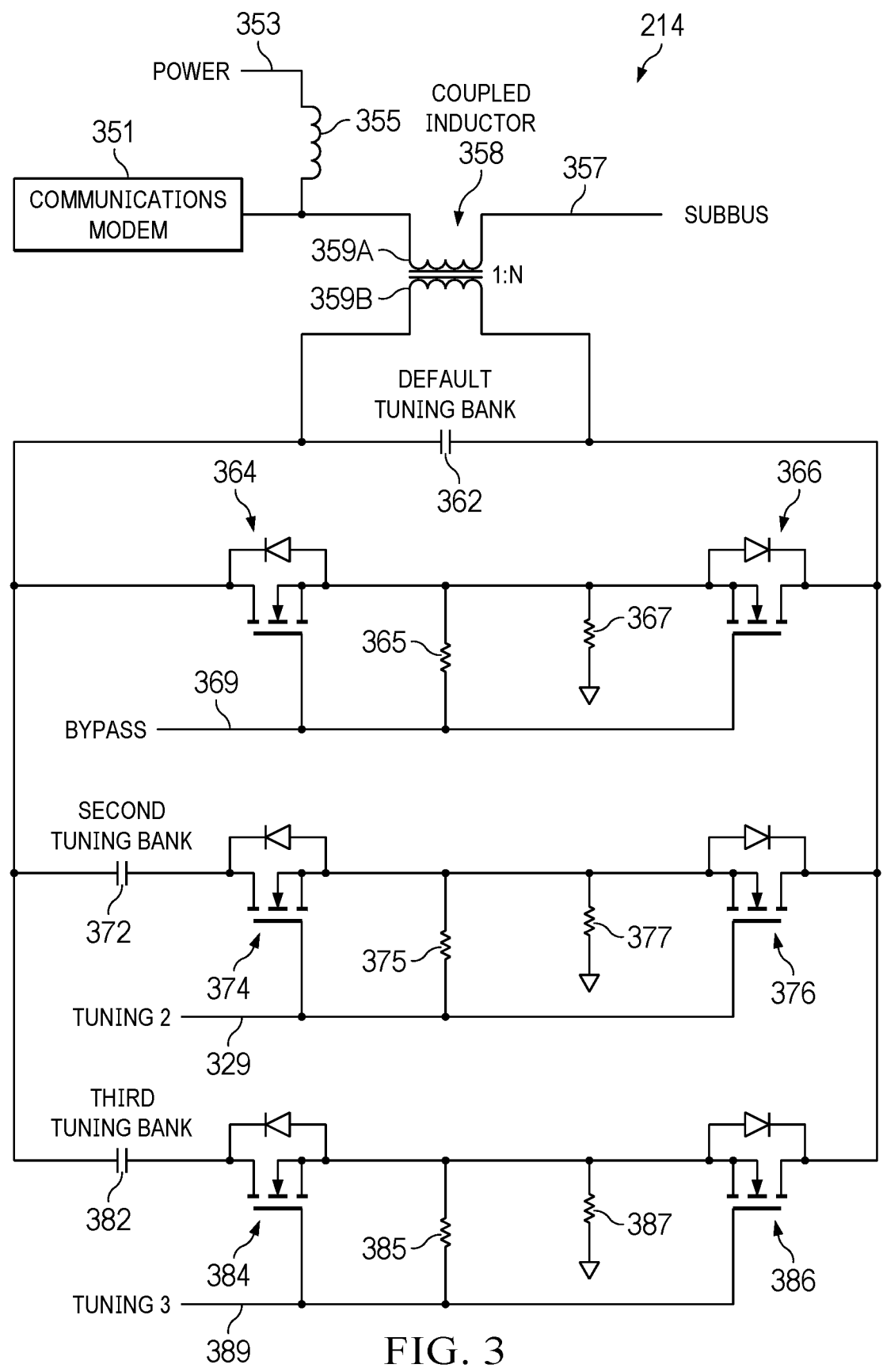
FIG. 3 is a schematic diagram of the tunable multi-channel communications filter of FIG. 2.
Figure 6:
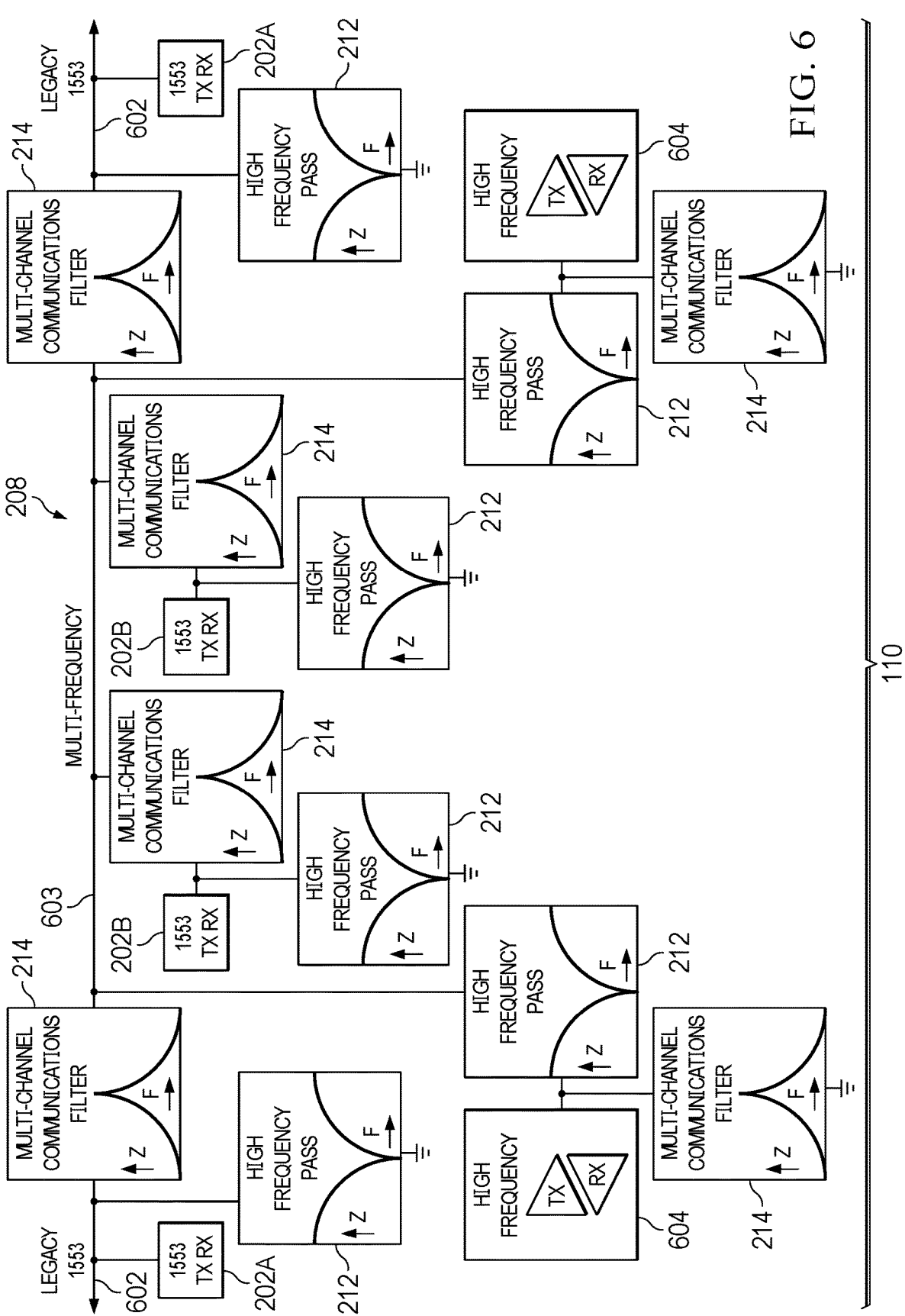
FIG. 6 is a schematic view of sensors coupled to a single wire bus of the bottom hole assembly of FIG. 2.

FIG. 3 is a schematic diagram of the tunable multi-channel communications filter 214 of FIG. 2. The tunable multi-channel communications filter 214 includes a coupled inductor 358 having a primary winding 359A that is coupled to a legacy communications modem 351 and subbus 357, and magnetically coupled to one or more secondary windings 359B. Further, power 353 is transmitted through inductor 355 and the primary winding 359A of the coupled inductor 358 such that only the primary winding 359A handles the power 353, whereas all other electronic components of the tunable multi-channel communications filter 214 are coupled to the secondary winding 359B of the coupled inductor 358. The foregoing reduces or eliminates a need for switches such as electro-mechanical relays, semiconductors, or transistors, and other components of the tunable multi-channel communications filter 214 that are not directly coupled to the primary winding 359A, to be rated for the voltage, current, and power of the subbus 357. In one or more of such embodiments, only the coupled inductor 358 of the tunable multi-channel communications filter 214 is rated for the voltage, current, and power of the subbus 357, or another subbus the tunable multi-channel communications filter 214 is coupled to. In one or more of such embodiments, the turns ratio of the coupled inductor 358 are adjustable to achieve certain advantages. For example, the number of Secondary winding turns is reduced relative to the Primary based on the following equation, so that the reflected capacitance of the tuning banks connected to the secondary is reduced in the Primary by the square of the turns ratio, see expression below.

$$Nsec<Npri \text{ or } Nsec/Npri<1 \qquad \text{Equation 1}$$

where Nsec is the number of secondary winding turns, and where Npri is the number of primary turns The foregoing allows larger capacitance values to be used in the tuning banks, thereby making them less sensitive to capacitive parasitics in a circuit or system that the tunable multi-channel communications filter 214 is deployed in, such as the system illustrated in FIG. 6, thereby making the tunable multi-channel communications filter 214 more robust. In some embodiments, the tuning capacitance that is reflected from the secondary winding 359B into the primary winding 359A is calculated based on the following equation.

$$Reflected C_{pri}=C_{sec}\times(N_{sec}/N_{pri})^2 \qquad \text{Equation 2:}$$

where:

$C_{pri}$=Tuning Capacitance reflected into the Primary winding $C_{sec}$=Tuning Capacitance connected to the Secondary winding $N_{pri}$=Number of Primary winding Turns $N_{sec}$=Number of Secondary winding Turns In the embodiment of FIG. 3, tuning banks 362, 372, and 382 (default tuning bank, second tuning bank, third tuning bank, respectively) are parallel to secondary winding 359B. Each tuning bank 362, 372, and 382 is formed from one or more discrete capacitors. Moreover, each tuning bank 362, 372, and 382 is coupled to one or more switches that are configured to control the respective tuning banks. Examples of switches that are utilized include, but are not limited to, MOSFETs, JFETs, BJTs, analog switches, electro-mech relays, and similar types of switches. In the embodiment of FIG. 3, the default tuning bank 362, second tuning bank 372, and third tuning bank 382 are coupled to N Channel MOSFETs 364 and 366, 374 and 376, and 384 and 386 respectively. Moreover, the N Channel MOSFETs 364 and 366, 374 and 376, and 384 and 386 are also coupled to biasing resistors 365 and 367, 375 and 377, and 385 and 387 respectively. Moreover N Channel MOSFETS 364 and 366, 374 and 376, and 374 and 376, are connected Source to Source to reduce or prevent the body diodes from conducting.

Figure 5:
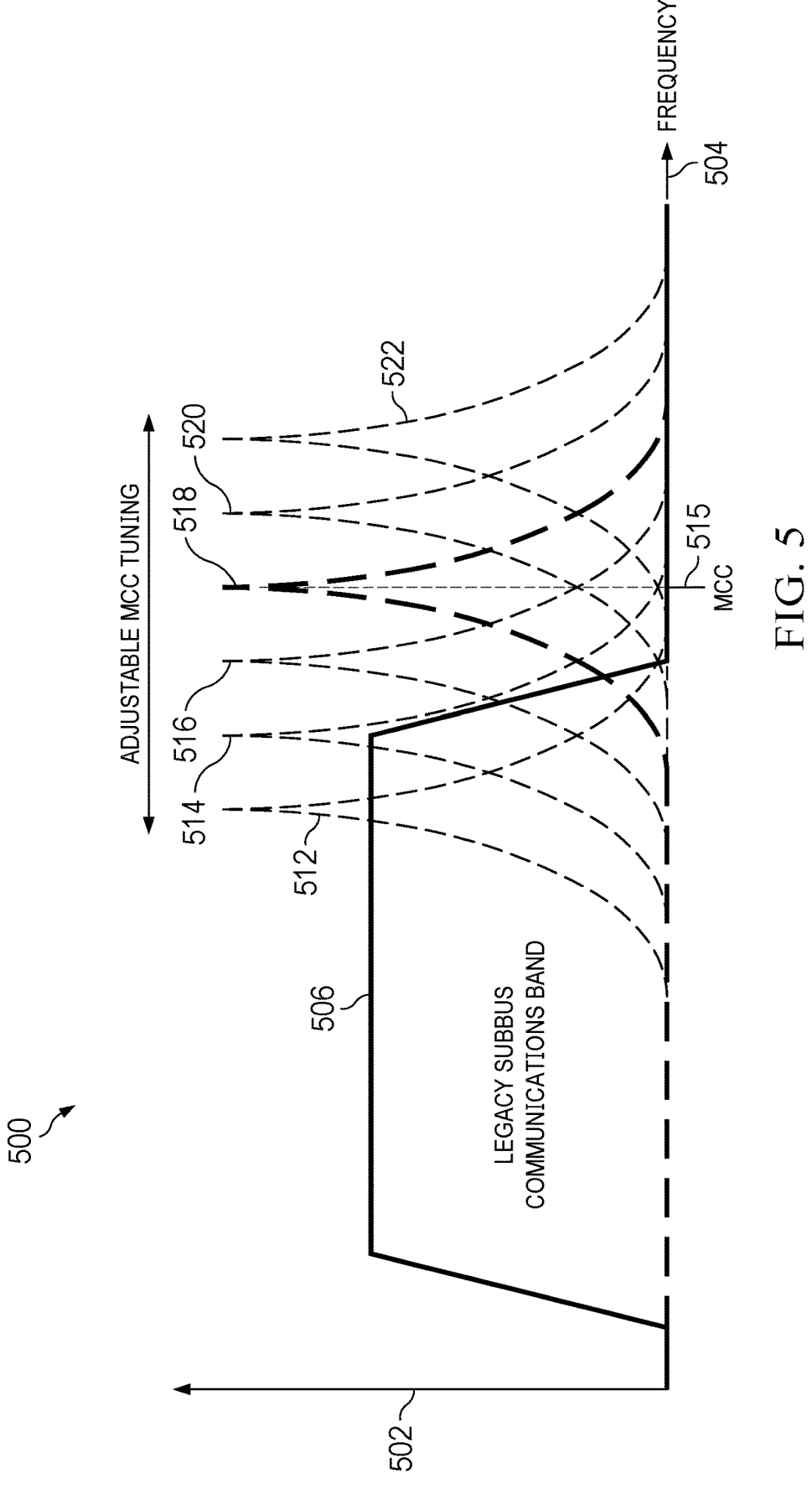
FIG. 5 is a graph illustrating an adjustable range of the tunable multi-channel communications filters of FIGS. 3, 4A, and 4B.

In the embodiment of FIG. 3, a threshold amount of capacitance is included across one or more discrete capacitors of the default tuning bank 362 to establish a default (minimum) tuning. Moreover, additional tuning cap banks are adjustable to switch in (or out) to adjust the tuning to an optimum point or above a threshold point for the tunable multi-channel communications filter 214, such as shown in FIG. 5. In some embodiments, the switches are connected to a fixed voltage to provide a static filter tuning. In some embodiments, the switches are controlled dynamically on the fly or statically by a microcontroller or a processor (not shown). For example, in the embodiment of FIG. 3, the microcontroller/processor is connected to the gates of the MOSFETs, the nodes labeled Tuning 2 (329), Tuning 3 (389) and Bypass (369). In one or more of such embodiments, the microcontroller/processor is connected to the MOSFETs directly or via a gate driver or some other device. The voltage provided at the gate of the MOSFET, together with the bias resistors, creates a bias that turns the switches on or off. When the switches are on, the associated tuning cap bank is connected in parallel to the default bank, effectively adding the two banks together as a single tuning bank. When the switches are off, the associated bank is disconnected. In some embodiments, banks are connected one at a time and/or in any combination to create a matrix of possible tuning capacitance values that are iterated through to determine the optimal tuning selection for the filter/system.

The tunable multi-channel communications filter 214 includes a bypass configuration 369, which, when selected, provides a short circuit or low impedance path, thereby removing the tunable multi-channel communications filter 214 when it is not needed. In some embodiments, the bypass configuration 369 may be manually or dynamically selected in real time or near real time to selectively remove tunable multi-channel communications filter 214.

Although FIG. 3 illustrates three tuning banks 362, 372, and 382 that are coupled to the secondary windings 359B of the tunable multi-channel communications filter 214, in some embodiments, a different number of tuning banks (not shown) are coupled to the secondary windings 359B of the tunable multi-channel communications filter 214. In some embodiments only the default tuning bank 362 is coupled to the secondary windings 359B of the tunable multi-channel communications filter 214. In some embodiments, each tuning bank that is coupled to the secondary windings 359B of the tunable multi-channel communications filter 214 allows tuning with a specific range that differs from the ranges of other tuning banks. In one or more of such embodiments, some of the tuning banks (for example the default tuning bank 362 and the third tuning bank 382) are adjusted while other tuning banks (the second tuning bank 372) are not adjusted. In some embodiments, the frequency range of certain tuning banks partially overlaps the frequency range of other tuning banks. Although FIG. 3 illustrates two N type MOSFETs (such as N MOSFETs 364 and 366) and two biasing resistors (such as biasing resistors 365 and 367) coupled to each tuning bank, in some embodiments, a different number or types of switches are coupled to the tuning banks. Further, in some embodiments, a different number of biasing resistors or no biasing resistor is coupled to the tuning banks.

Figure 4A:
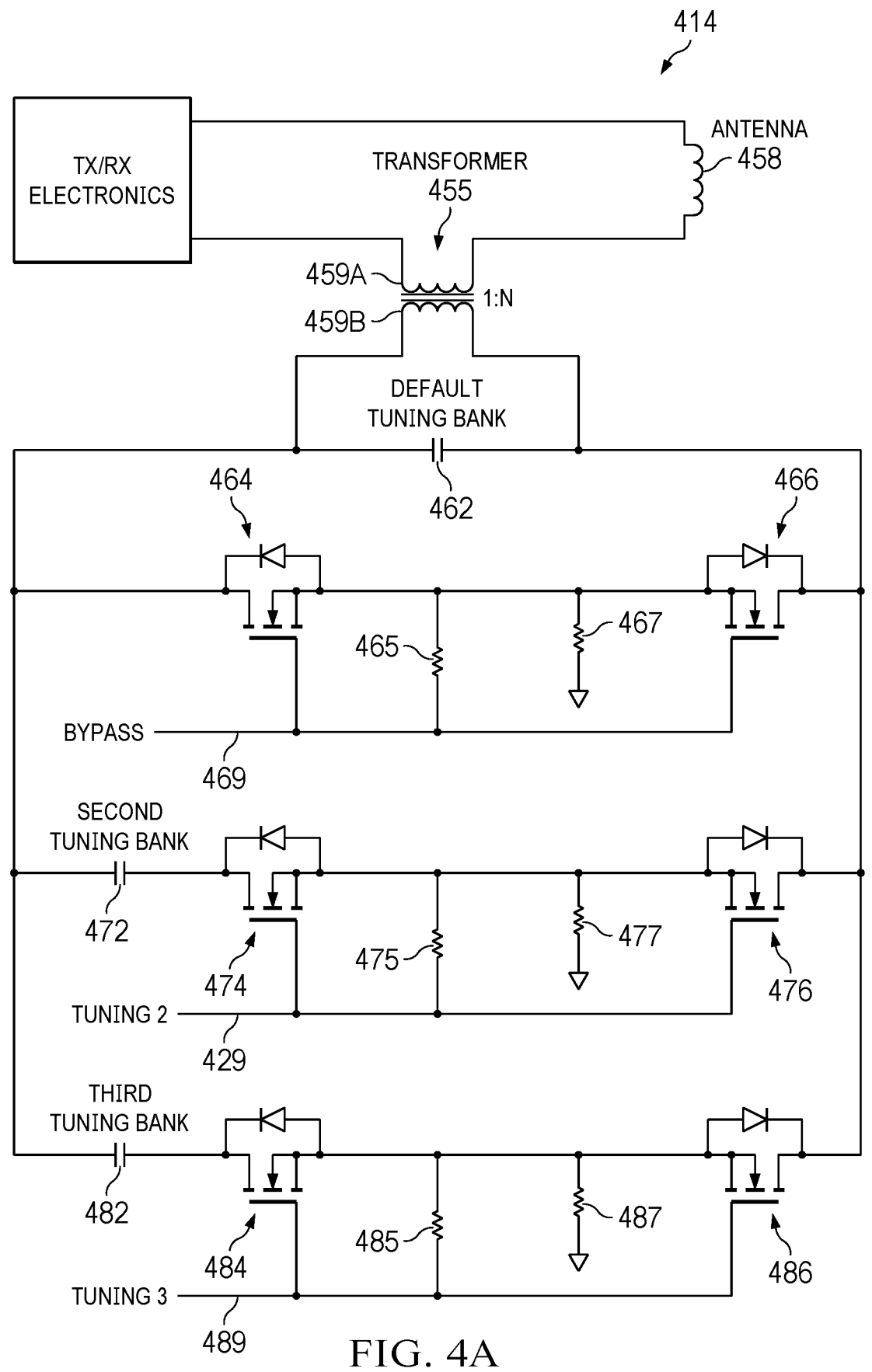
FIG. 4A is a schematic diagram of an apparatus that utilizes a tunable multi-channel communications filter concept for series antenna tuning, where the apparatus is deployable in the bottom hole assembly of FIG. 2.

FIG. 4A is a schematic diagram of an apparatus 414 that utilizes a tunable multi-channel communications filter concept for series antenna tuning, where the apparatus 414 is deployable in the bottom hole assembly of FIG. 2. In the embodiment of FIG. 4A, apparatus 414 is coupled to one or more transmitter and receiver antennas 458, such as transmitter and receiver antennas of a resistivity tool. Apparatus 414 includes tuning banks 462, 472, and 482, N Channel MOSFETs 464 and 466, 474 and 476, and 484 and 486, biasing resistors 465 and 467, 475 and 477, and 485 and 487, which are similar to or identical to tuning banks 362, 372, and 382, N Channel MOSFETs 364 and 366, 374 and 376, and 384 and 386, biasing resistors 365 and 367, 375 and 377, and 385 and 387 of tunable multi-channel communications filter 214, and are described herein.

The apparatus 414 includes a transformer 455 having a primary winding 459A that is coupled to the transmitter and receiver antennas 458, and magnetically coupled to one or more secondary windings 359B. In the embodiment of FIG. 4A, the transformer 455 is positioned in series with the antenna 458. Moreover, the tuning banks 462, 472, and 482 and the switches (such as N Channel MOSFETs 464 and 466, 474 and 476, and 484 and 486) are positioned on the secondary side of the transformer 455, and are isolated from antenna 458 such that the threshold bias voltage (or current) to turn the switches on and off are not impacted by the antenna signal of the antenna 458, thereby simplifying the control of apparatus 414 and improving the reliability of apparatus 414.

In one or more of such embodiments, the turns ratio of the transformer 455 are adjustable to achieve certain advantages. For example, the number of Secondary winding turns is reduced relative to the Primary based on the Equations 1, so that the reflected capacitance of the tuning banks connected to the secondary is reduced in the Primary by the square of the turns ratio. (see Equations 1 and 2)

In the embodiment of FIG. 4A, a threshold amount of capacitance is included across one or more discrete capacitors of the default tuning bank 462 to establish a default (minimum) tuning. Moreover, additional tuning cap banks are adjustable to switch in (or out) to adjust the tuning to an optimum point or above a threshold point for the apparatus 414, such as shown in FIG. 5. In some embodiments, the switches are connected to a fixed voltage to provide a static filter tuning. In some embodiments, the switches are controlled dynamically on the fly or statically by a microcontroller or a processor (not shown). For example, in the embodiment of FIG. 4A, the microcontroller/processor is connected to the gates of the MOSFETs, the nodes labeled Tuning 2 (429), Tuning 3 (489) and Bypass (469). In one or more of such embodiments, the microcontroller/processor is connected to the MOSFETs directly or via a gate driver or some other device. The voltage provided at the gate of the MOSFET, together with the bias resistors, creates a bias that turns the switches on or off. When the tuning switches are on, the associated tuning cap bank is connected in parallel to the default bank, effectively adding the two banks together as a single tuning bank. When the tuning switches are off, the associated bank is disconnected. In some embodiments, banks are connected one at a time and/or in any combination to create a matrix of possible tuning capacitance values that are iterated through to determine the optimal tuning selection for the filter/system.

The apparatus 414 includes a bypass configuration 469, which, when selected, provides a short circuit or low impedance path, thereby removing the apparatus 414 when it is not needed. In some embodiments, the bypass configuration 469 may be manually or dynamically selected in real time or near real time to selectively remove apparatus 414, so that the antenna could be used in an untuned or wideband condition.

Figure 4B:
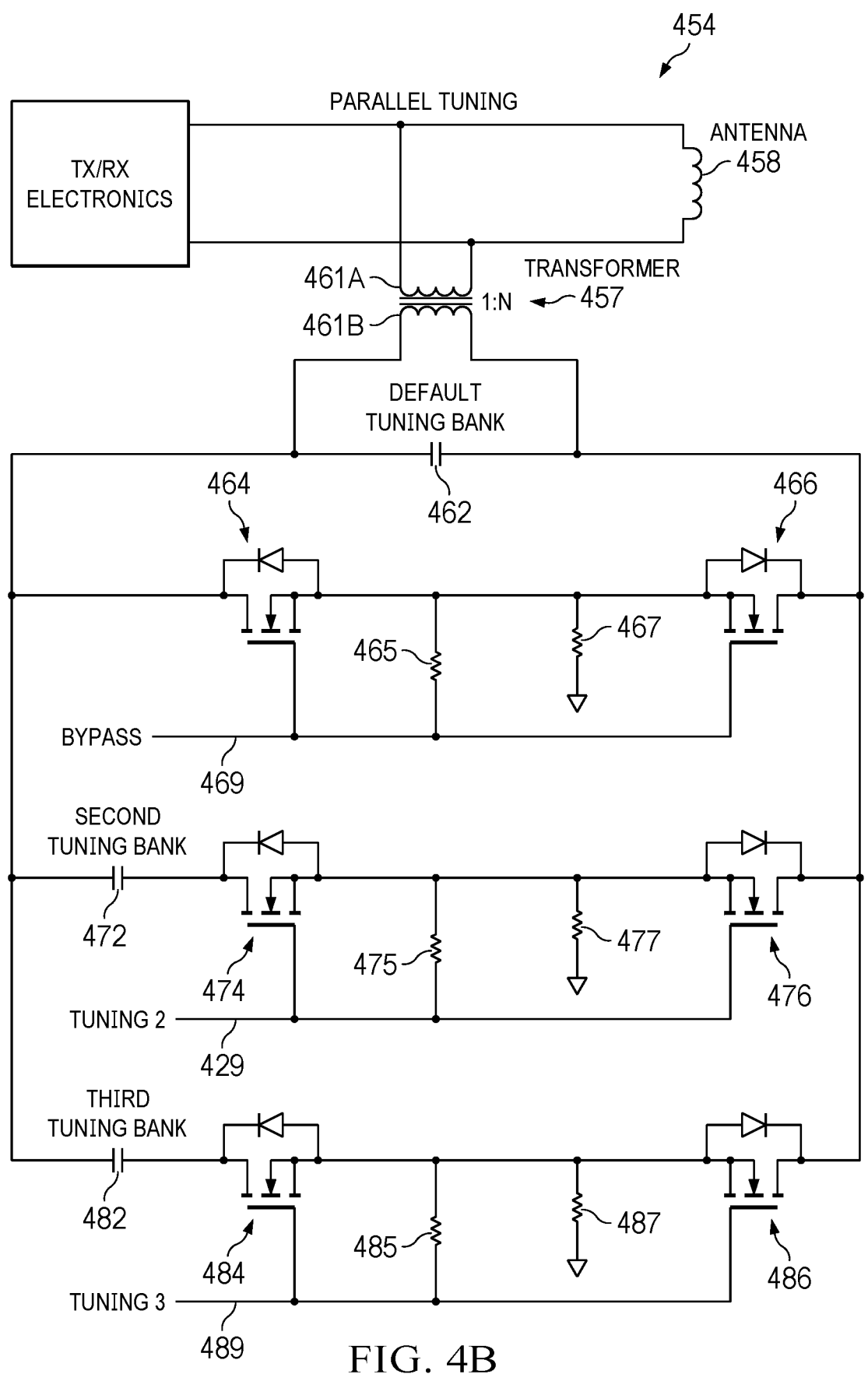
FIG. 4B is a schematic diagram of another apparatus that utilizes the tunable multi-channel communications filter concept for parallel antenna tuning, where the apparatus is deployable in the bottom hole assembly of FIG. 2.

FIG. 4B is a schematic diagram of another apparatus 454 that utilizes the tunable multi-channel communications filter concept for parallel antenna tuning, where the apparatus 454 is deployable in the bottom hole assembly of FIG. 2. In the embodiment of FIG. 4B, apparatus 454 is coupled to one or more transmitter and receiver antennas 458, such as transmitter and receiver antennas of a resistivity tool. Apparatus 454 includes tuning banks 462, 472, and 482, N Channel MOSFETs 464 and 466, 474 and 476, and 484 and 486, biasing resistors 465 and 467, 475 and 477, and 485 and 487, which are similar to or identical to tuning banks 362, 372, and 382, N Channel MOSFETs 364 and 366, 374 and 376, and 384 and 386, biasing resistors 365 and 367, 375 and 377, and 385 and 387 of tunable multi-channel communications filter 214, and are described herein.

The apparatus 454 includes a transformer 457 having a primary winding 461A that is coupled to the transmitter and receiver antennas 458, and magnetically coupled to one or more secondary windings 461B. In the embodiment of FIG. 4B, the transformer 457 is positioned in parallel with the antenna 458. Moreover, the tuning banks 462, 472, and 482 and the switches (such as N Channel MOSFETs 464 and 466, 474 and 476, and 484 and 486) are positioned on the secondary side of the transformer 457, and are isolated from antenna 458 such that the threshold bias voltage (or current) to turn the switches on and off are not impacted by the antenna signal of the antenna 458, thereby simplifying the control of apparatus 454 and improving the reliability of apparatus 454.

In one or more of such embodiments, the turns ratio of the transformer 457 are adjustable to achieve certain advantages. For example, the number of Secondary winding turns is reduced relative to the Primary based on the Equations 1, so that the reflected capacitance of the tuning banks connected to the secondary is reduced in the Primary by the square of the turns ratio. (see Equations 1 and 2)

In the embodiment of FIG. 4B, a threshold amount of capacitance is included across one or more discrete capacitors of the default tuning bank 462 to establish a default (minimum) tuning. Moreover, additional tuning cap banks are adjustable to switch in (or out) to adjust the tuning to an optimum point or above a threshold point for the apparatus 454, such as shown in FIG. 5. In some embodiments, the switches are connected to a fixed voltage to provide a static filter tuning. In some embodiments, the switches are controlled dynamically on the fly or statically by a microcontroller or a processor (not shown). For example, in the embodiment of FIG. 4B, the microcontroller/processor is connected to the gates of the MOSFETs, the nodes labeled Tuning 2 (429), Tuning 3 (489) and Bypass (469). In one or more of such embodiments, the microcontroller/processor is connected to the MOSFETs directly or via a gate driver or some other device. The voltage provided at the gate of the MOSFET, together with the bias resistors, creates a bias that turns the switches on or off. When the tuning switches are on, the associated tuning cap bank is connected in parallel to the default bank, effectively adding the two banks together as a single tuning bank. When the tuning switches are off, the associated bank is disconnected. In some embodiments, banks are connected one at a time and/or in any combination to create a matrix of possible tuning capacitance values that are iterated through to determine the optimal tuning selection for the filter/system.

The apparatus 454 includes a bypass configuration 469, which, when selected, provides a short circuit or low impedance path, thereby shunting the antenna 458 in the parallel configuration, which could be useful in some cases where it is desirable to eliminate the antenna signal or impedance. In some embodiments, the bypass configuration 469 may be manually or dynamically selected in real time or near real time to selectively remove apparatus 454.

FIG. 5 is a graph 500 illustrating an adjustable range of the tunable multi-channel communications filter 214 of FIG. 3. Axis 502 represents signal impedance, whereas axis 504 represents a frequency range of signals transmitted through the tunable multi-channel communications filter, such as the tunable multi-channel communications filter 214. Further, line 515 represents the multi-channel communications operating frequency for which maximum signal impedance provided by the tunable multi-channel communications filter 214 is desired. Further, trapezoid 506 represents a frequency range of signals transmitted in the legacy subbus communication band. Further, each of dashed lines 512, 514, 516, 520, and 522, and solid line 518 provides an illustration of the change in impedance of the tunable multi-channel communications filter 214 at different tuned settings, where signals that are encapsulated by one of the dash or solid lines (such as line 512) and axis 504 are filtered by the tunable multi-channel communications filter 214. In the embodiment of FIG. 5, dash lines 512, 514, and 516 fall within a significant part of the frequency range of signals transmitted in the legacy subbus communication band, and would filter the signals transmitted in the legacy subbus communication band. As such, the tunable multi-channel communications filter 214 is adjusted such that the impedance of the tunable multi-channel communications filter 214 over a frequency range takes the form illustrated by solid line 518. Although FIG. 5 illustrates six different lines 512, 514, 516, 518, 520, and 522, the tunable multi-channel communications filter 214 is adjustable over a different frequency range to filter out signals of a different frequency range without impeding signals of the legacy subbus communication band.

FIG. 6 is a schematic view of the legacy sensors 202 and deep reading resistivity tool transceivers 604 coupled to a single wire bus 208 of the BHA 110. The BHA 110 includes the legacy sensors 202A coupled to legacy portions 602 of the single wire bus 208. The legacy portions 602 of the single wire bus 208 are positioned at either end of the single wire bus 208 and are separated from a multi-channel communication portion 603 of the single wire bus 208 by tunable multi-channel communications filters 214. In the illustrated embodiment, the tunable multi-channel communications filters 214 that separate the legacy portions 602 from the multi-channel communication portion 603 of the single wire bus 208 may be replaced by the low pass filters 210, as discussed above with respect to FIG. 2. The low pass filters 210 may limit frequencies available for use on the legacy portion 602 of the single wire bus 208, but when the legacy sensors 202A operate at a single frequency that is less than the tones of interest (such as at a frequency represented by line 515 of FIG. 5) of the deep reading resistivity tool transceivers 604, the low pass filters 210 are sufficient to block the higher frequency signals of the deep reading resistivity tool transceivers 604 from the legacy sensors 202A. Higher order filters to achieve a higher order response may also be implemented between the legacy portions 602 and the multi-channel communication portion 603 of the single wire bus 208 by cascading additional tunable multi-channel communications filters 214 in series with the illustrated tunable multi-channel communications filters 214.

In the illustrated embodiment, high frequency pass filters 212 are also positioned shunted to ground along the legacy portion 602 of the single wire bus 208. These high frequency pass filters 212 provide a further mechanism to filter high frequency noise from the legacy portion 602 of the single wire bus 208. For example, the high frequency pass filter 212 shunts any remaining high frequency signals at the tone of interest (such as at a frequency represented by line 515 of FIG. 5) to ground. In this manner, the legacy portion 602 maintains lower frequency legacy signals while preventing any higher frequency signals from being injected to the legacy transceiver.

Within the multi-channel communication portion 603 of the single wire bus 208, FIG. 6 illustrates a pair of deep reading resistivity tool transceivers 604, which are included in place of the deep reading resistivity tool transmitter 204 and the deep reading resistivity tool receivers 206A and 206B illustrated in FIG. 2. The deep reading resistivity tool transceivers 604 each provide transmitter and receiver functions to the BHA 110, and the deep reading resistivity tool transceivers 604 use the higher frequency signals from the multi-channel communication portion 603 of the single wire bus 208 for downhole communication and synchronization. Similar to the deep reading resistivity tool transmitter 204 and the deep reading resistivity tool receivers 206A and 206B of FIG. 2, the deep reading resistivity tool transceivers 604 each include high frequency pass filters 212 and tunable multi-channel communications filters 214. The high frequency pass filters 212 allow the higher frequency deep reading resistivity tool signals to pass to the deep reading resistivity tool transceivers 604.

Higher order filters with a higher order response may also be implemented between the deep reading resistivity tool transceivers 604 and the single wire bus 208 by cascading additional high frequency pass filters 212 in series with the illustrated high frequency pass filter 212.

To inject clean deep reading resistivity tool signals onto the single wire bus 208, the deep reading resistivity tool transceivers 604 are coupled to the tunable multi-channel communications filters 214 shunted to ground. The tunable multi-channel communications filters 214 shunt to ground any lower frequency signals or noise that may be present in a deep reading resistivity tool signal applied to the single wire bus 208 from the deep reading resistivity tool transceivers 604. When receiving a high frequency signal from the single wire bus 208, the tunable multi-channel communications filters 214 shunt to ground any remaining lower frequency noise that may be present in the deep reading resistivity tool signal after filtering by the high frequency pass filters 212.

Also included along the multi-channel communication portion 603 of the single wire bus 208 are the legacy sensors 202B. As with the legacy sensors 202B depicted in FIG. 2, the legacy sensors 202B include a tunable multi-channel communications filter 214 to prevent the higher frequency deep reading resistivity tool signals from the deep reading resistivity tool transceivers 604 from interfering with legacy sensors communications and operations 202B. The high frequency pass filter 212 coupled between the legacy sensors 202B and ground provide a path to shunt any high frequency noise in the legacy signal after filtering by the tunable multi-channel communications filter 214.

In an embodiment, the deep reading resistivity tool transceiver 604, and the transmitter 204 and receivers 206A and 206B discussed above with respect to FIG. 2, operate by injecting electromagnetic signals into the formation 112 surrounding the BHA 110 and receiving the injected electromagnetic signals from the formation 112. By comparing the injected signal to the received signal, an operator is able to determine resistivity of the formation 112. The resistivity of the formation 112 provides an indication of characteristics of the formation 112. These characteristics are used by the operator to determine, for example, when the drill bit 114 has entered a pay zone of the formation 112. The transceivers 604 and/or the transmitter 204 and receiver 206 combination may perform a measurement operation of the formation 112 while the drill bit 114 is drilling into the formation 112 (e.g., in a logging while drilling (LWD) configuration), while the drilling system 100 is wiping the wellbore 109 (e.g., when the BHA 110 is run up or down the wellbore 109), while the BHA 110 is tripping out of the wellbore 109 to the surface 120, or during any other operation that provides an adequate platform for conducting the measurements with the BHA 110. The above-disclosed embodiments have been presented for purposes of illustration and to enable one of ordinary skill in the art to practice the disclosure, but the disclosure is not intended to be exhaustive or limited to the forms disclosed. Many insubstantial modifications and variations will be apparent to those of ordinary skill in the art without departing from the scope and spirit of the disclosure.

FIG. 7 is a flow chart 700 of a method to perform multi-channel communication filter tuning across the single wire bus of FIG. 6. At block 702, multi-channel communications and legacy channel communications are established. In some embodiments, both legacy communicators and multi-channel communications communicators are equipped with high speed Analog to Digital (A/D) converters to digitize their signals of interest. At block 704, one or more metrics of legacy channel communications, such as the error rate (using failed responses after timeout or retries), amplitude, frequency range and/or waveform quality/shape of the signals of the legacy channel communications are evaluated in the digital domain using the high speed samples acquired using the A/D aforementioned. Similarly, at block 706, one or more metrics of multi-channel communications, such as the error rate, amplitude, frequency range and/or waveform quality of the signals of the multi-channel communications are evaluated in the digital domain using the A/D samples aforementioned. At block 708, a tunable multi-channel communications filter is adjusted to be properly tuned for the multi-channel communications operating frequency and reduce impedance of the multi-channel communications filter on legacy signals communicated within the frequency range of the legacy channel communications. At block 710, some or all of the operations at blocks 702, 704, 706, and 708 are periodically or dynamically performed to fine-tune the multi-channel communications filter(s). In some embodiments, multiple multi-channel communications filters are concurrently or sequentially tuned in the BHA during this process. In some embodiments, legacy channel communications and multi-channel communications are repeatedly reestablished until all (or a threshold of) options are executed and/or optimal solutions (or solutions within an acceptable threshold) have converged. At block 712, the multi-channel communications filter(s) is continuously or dynamically fine-tuned until the multi-channel communications filter is at an optimal range, or a range that is within an acceptable threshold, at which point, optimum (or acceptable) tuning selections are assigned to the modem (s).

It is understood that deep reading resistivity tools are described herein to provide exemplary applications of the subject technologies described herein. More particularly, the subject technologies described herein may be incorporated into any application where such a communication or synchronization scheme is utilized. Further, it is understood that the disclosed subject technologies are configured to provide in-situ solid state tunability.

The above-disclosed embodiments have been presented for purposes of illustration and to enable one of ordinary skill in the art to practice the disclosure, but the disclosure is not intended to be exhaustive or limited to the forms disclosed. Many insubstantial modifications and variations will be apparent to those of ordinary skill in the art without departing from the scope and spirit of the disclosure. For instance, although the flowcharts depict a serial process, some of the steps/processes may be performed in parallel or out of sequence or combined into a single step/process. The scope of the claims is intended to broadly cover the disclosed embodiments and any such modification. Further, the following clauses represent additional embodiments of the disclosure and should be considered within the scope of the disclosure.

Clause 1, a multi-channel communications filter, comprising a coupled inductor having a primary winding that is coupled to a power source and magnetically coupled to one or more secondary windings; a tuning bank formed from a first set of capacitors; and a first set of switches that are configured to adjust capacitance of the first set of capacitors to impede signals having a first frequency range from flowing through the multi-channel communications filter, wherein the tuning bank and the first set of switches are coupled to the one or more secondary windings.

Clause 2, the multi-channel communications filter of clause 1, further comprising a bypass configured to form a low impedance path around components that are coupled to the one or more secondary windings.

Clause 3, the multi-channel communications filter of clauses 1 or 2, further comprising: a second tuning bank formed from a second set of capacitors; and a second set of switches that are configured to adjust capacitance of the second set of capacitors to impede signals having a second frequency range from flowing through the multi-channel communications filter, wherein the second tuning bank and the second set of switches are coupled to the one or more secondary windings.

Clause 4, the multi-channel communications filter of clause 3, further comprising a third tuning bank formed from a third set of capacitors; and a third set of switches that are configured to adjust capacitance of the third set of capacitors to impede signals having a third frequency range from flowing through the multi-channel communications filter, wherein the third tuning bank and the third set of switches are coupled to the one or more secondary windings.

Clause 5, the multi-channel communications filter of clause 4, wherein the first frequency range, the second frequency range, and the third frequency range are different ranges.

Clause 6, the multi-channel communications filter of clause 5, wherein the first frequency range and the second frequency range partially overlap each other.

Clause 7, the multi-channel communications system of any of clauses 1-6, wherein the first set of switches are MOSFETs, Clause 8, the multi-channel communications filter of any of clauses 1-7, further comprising a biasing resistor that is coupled to the tuning bank.

Clause 9, a method to perform multi-channel communications, the method comprising: establishing multi-channel communications and legacy channel communications; evaluating a frequency range of legacy channel communications; evaluating a frequency range of multi-channel communications; and adjusting a tunable multi-channel communications filter to be tuned for the multi-channel communications operating frequency and reduce impedance of the multi-channel communications filter on legacy signals communicated within the frequency range of the legacy channel communications.

Clause 10, the method of clause 9, wherein evaluating the frequency range of the legacy channel communications comprises evaluating one or more of an error rate, amplitude, frequency range, waveform quality, and waveform shape of signals of the legacy channel communications.

Clause 11, the method of clauses 9 or 10, wherein evaluating the frequency range of the multi-channel communications comprises evaluating one or more of an error rate, amplitude, frequency range, waveform quality, and waveform shape of signals of the multi-channel communications.

Clause 12, the method of any of clauses 9-11, further comprising concurrently adjusting a second tunable multi-channel communications filter to be tuned for the multi-channel communications operating frequency and reduce impedance of the second multi-channel communications filter on legacy signals communicated within the frequency range of the legacy channel communications.

Clause 13, the method of any of clauses 9-12, further comprising after adjusting the tunable multi-channel communication filter, adjusting a second tunable multi-channel communications filter to be tuned for the multi-channel communications operating frequency and reduce impedance of the second multi-channel communications filter on legacy signals communicated within the frequency range of the legacy channel communications.

Clause 14, the method of any of clauses 9-13, further comprising dynamically readjusting the tunable multi-channel communications filter to be tuned for the multi-channel communications operating frequency and reduce impedance of the multi-channel communications filter on legacy signals communicated within the frequency range of the legacy channel communications.

Clause 15, an apparatus that utilizes a tunable multi-channel communications filter for series antenna tuning, comprising: a transformer having a primary winding that is coupled to an antenna and magnetically coupled to one or more secondary windings; a tuning bank formed from a first set of capacitors; and a first set of switches that are configured to adjust capacitance of the first set of capacitors to tune signals having a first frequency range from flowing through the multi-channel communications filter, wherein the tuning bank and the first set of switches are coupled to the one or more secondary windings.

Clause 16, the apparatus of clause 15, wherein the transformer is in a series configuration with the antenna.

Clause 17, the apparatus of clause 15, wherein the transformer is in a parallel configuration with the antenna.

Clause 18, the apparatus of any of clauses 15-17, further comprising a bypass configured to form a low impedance path around components that are coupled to the one or more secondary windings.

Clause 19, the apparatus of any of clauses 15-18, further comprising: a second tuning bank formed from a second set of capacitors; and a second set of switches that are configured to adjust capacitance of the second set of capacitors to tune signals having a second frequency range from flowing through the multi-channel communications filter, wherein the second tuning bank and the second set of switches are coupled to the one or more secondary windings.

Clause 20, the apparatus of clause 19, further comprising: a third tuning bank formed from a third set of capacitors; and a third set of switches that are configured to adjust capacitance of the third set of capacitors to tune signals having a third frequency range from flowing through the multi-channel communications filter, wherein the third tuning bank and the third set of switches are coupled to the one or more secondary windings.

As used herein, the singular forms "a," "an," and "the" are intended to include the plural forms as well, unless the context clearly indicates otherwise. It will be further understood that the terms "comprise" and/or "comprising," when used in this specification and/or in the claims, specify the presence of stated features, steps, operations, elements, and/or components, but do not preclude the presence or addition of one or more other features, steps, operations, elements, components, and/or groups thereof. In addition, the steps and components described in the above embodiments and figures are merely illustrative and do not imply that any particular step or component is a requirement of a claimed embodiment.

What is claimed is:

1. A multi-channel communication filter comprising:
   a transformer comprising a coupled inductor having a primary winding that is coupled to a power source and being magnetically coupled to one or more secondary windings;
   a tuning bank including a first set of capacitors; and
   a first set of switches configured to adjust capacitance of the first set of capacitors to tune the multi-channel communication filter for signals having a first frequency range through the multi-channel communication filter,
   wherein the tuning bank and the first set of switches are coupled to the one or more secondary windings, and
   wherein the primary winding is isolated from the tuning bank.

2. The multi-channel communication filter of claim 1, further comprising a bypass configured to form a low impedance path around components that are coupled to the one or more secondary windings.

3. The multi-channel communication filter of claim 1, further comprising:
   a second tuning bank including a second set of capacitors; and
   a second set of switches configured to adjust capacitance of the second set of capacitors to tune the multi-channel communication filter for signals having a second frequency range through the multi-channel communication filter, wherein the second tuning bank and the second set of switches are coupled to the one or more secondary windings.

4. The multi-channel communication filter of claim 3, further comprising:

a third tuning bank including a third set of capacitors; and a third set of switches configured to adjust capacitance of the third set of capacitors to impede flow of signals having a third frequency range through the multi-channel communication filter, wherein the third tuning bank and the third set of switches are coupled to the one or more secondary windings.

5. The multi-channel communication filter of claim 4, wherein the first frequency range, the second frequency range, and the third frequency range are different ranges.

6. The multi-channel communication filter of claim 5, wherein the first frequency range and the second frequency range partially overlap each other.

7. The multi-channel communication system of claim 1, wherein the first set of switches are MOSFETs.

8. The multi-channel communication filter of claim 1, further comprising a biasing resistor that is coupled to the tuning bank.

9. A method to perform multi-channel communication, the method comprising:

establishing multi-channel communication and legacy channel communication;

evaluating a frequency range of legacy channel communication;

evaluating a frequency range of multi-channel communication that includes a multi-channel communications operating frequency; and adjusting a tunable multi-channel communication filter to be tuned for the multi-channel communication operating frequency and reduce impedance of the multi-channel communication filter on legacy signals communicated within the frequency range of the legacy channel communication, wherein the tunable multi-channel communication filter comprises a transformer having a primary winding and a secondary winding, wherein the primary winding is isolated from a tuning bank coupled to the secondary winding.

10. The method of claim 9, wherein the evaluating the frequency range of the legacy channel communication comprises evaluating one or more of an error rate, amplitude, frequency range, waveform quality, or waveform shape of signals of the legacy channel communication.

11. The method of claim 9, wherein the evaluating the frequency range of the multi-channel communication comprises evaluating one or more of an error rate, amplitude, frequency range, waveform quality, and waveform shape of signals of the multi-channel communication.

12. The method of claim 9, further comprising concurrently adjusting a second tunable multi-channel communication filter to be tuned for the multi-channel communication operating frequency and reduce impedance of the second multi-channel communication filter on the legacy signals communicated within the frequency range of the legacy channel communication.

13. The method of claim 9, further comprising, after adjusting the tunable multi-channel communication filter, adjusting a second tunable multi-channel communication filter to be tuned for the multi-channel communication operating frequency and reduce impedance of the second multi-channel communication filter on the legacy signals communicated within the frequency range of the legacy channel communication.

14. The method of claim 9, further comprising dynamically readjusting the tunable multi-channel communication filter to be tuned for the multi-channel communication operating frequency and reduce impedance of the multi-channel communication filter on the legacy signals communicated within the frequency range of the legacy channel communication.

15. An apparatus that utilizes a tunable multi-channel communication filter for antenna tuning, the apparatus comprising:

a transformer having a primary winding that is coupled to an antenna and being magnetically coupled to one or more secondary windings;

a tuning bank including a first set of capacitors; and a first set of switches configured to adjust capacitance of the first set of capacitors to tune the multi-channel communication filter for signals having a first frequency range through the multi-channel communication filter, wherein the tuning bank and the first set of switches are coupled to the one or more secondary windings, and wherein the primary winding is isolated from the tuning bank.

16. The apparatus of claim 15, wherein the transformer is in a series configuration with the antenna.

17. The apparatus of claim 15, wherein the transformer is in a parallel configuration with the antenna.

18. The apparatus of claim 15, further comprising a bypass configured to form a low impedance path around components that are coupled to the one or more secondary windings.

19. The apparatus of claim 15, further comprising:

a second tuning bank including a second set of capacitors; and a second set of switches configured to adjust capacitance of the second set of capacitors to tune the multi-channel communication filter for signals having a second frequency range through the multi-channel communication filter, wherein the second tuning bank and the second set of switches are coupled to the one or more secondary windings.

20. The apparatus of claim 19, further comprising:

a third tuning bank including a third set of capacitors; and a third set of switches configured to adjust capacitance of the third set of capacitors to tune the multi-channel communication filter for signals having a third frequency range through the multi-channel communication filter, wherein the third tuning bank and the third set of switches are coupled to the one or more secondary windings.

* * * * *